(12) United States Patent
Barday

(10) Patent No.: US 9,892,443 B2
(45) Date of Patent: *Feb. 13, 2018

(54) DATA PROCESSING SYSTEMS FOR MODIFYING PRIVACY CAMPAIGN DATA VIA ELECTRONIC MESSAGING SYSTEMS

(71) Applicant: OneTrust, LLC, Atlanta, GA (US)

(72) Inventor: Kabir A. Barday, Atlanta, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/619,382

(22) Filed: Jun. 9, 2017

(65) Prior Publication Data

US 2017/0287032 A1 Oct. 5, 2017

Related U.S. Application Data

(63) Continuation-in-part of application No. 15/256,419, filed on Sep. 2, 2016, now Pat. No. 9,691,090, which is a continuation of application No. 15/169,643, filed on May 31, 2016.

(60) Provisional application No. 62/317,457, filed on Apr. 1, 2016, provisional application No. 62/360,123, filed on Jul. 8, 2016, provisional application No. 62/353,802, filed on Jun. 23, 2016, provisional application No. 62/348,695, filed on Jun. 10, 2016.

(51) Int. Cl.
| | | |
|---|---|---|
| *G06Q 10/10* | (2012.01) | |
| *G06Q 40/08* | (2012.01) | |
| *G06F 21/31* | (2013.01) | |
| *G06Q 30/06* | (2012.01) | |
| *G06Q 10/06* | (2012.01) | |
| *G06Q 50/26* | (2012.01) | |

(52) U.S. Cl.
CPC . *G06Q 30/0609* (2013.01); *G06Q 10/063114* (2013.01); *G06Q 50/265* (2013.01)

(58) Field of Classification Search
CPC .................. G06Q 30/0609; G06Q 50/265
USPC ........................................ 705/1.1–912, 325
See application file for complete search history.

(56) References Cited

U.S. PATENT DOCUMENTS

| | | |
|---|---|---|
| 5,276,735 A | 1/1994 | Boebert et al. |
| 6,816,944 B2 | 11/2004 | Peng |

(Continued)

FOREIGN PATENT DOCUMENTS

WO  2015116905  8/2015

OTHER PUBLICATIONS

International Search Report, dated Jun. 21, 2017, from corresponding International Application No. PCT/US2017/025600.

(Continued)

*Primary Examiner* — Jonathan P Ouellette
(74) *Attorney, Agent, or Firm* — Brient Globerman, LLC

(57) ABSTRACT

In various embodiments, a privacy campaign data modification system is configured to store electronic messages in memory and associate those electronic messages with a particular privacy campaign. In particular, a privacy officer or other individual may receive e-mails or other electronic messages that are associated with an existing privacy campaign or an existing privacy impact assessment currently being performed for a particular privacy campaign. In various embodiments, it may be necessary to store and maintain the electronic messages for any suitable reason (e.g., record keeping, auditing, etc.).

20 Claims, 4 Drawing Sheets

(56) References Cited

U.S. PATENT DOCUMENTS

| | | |
|---|---|---|
| 6,925,443 B1 | 8/2005 | Baggett, Jr. et al. |
| 7,234,065 B2 | 6/2007 | Breslin et al. |
| 7,251,624 B1 | 7/2007 | Lee et al. |
| 7,260,830 B2 | 8/2007 | Sugimoto |
| 7,287,280 B2 | 10/2007 | Young |
| 7,478,157 B2 | 1/2009 | Bohrer et al. |
| 7,603,356 B2 | 10/2009 | Schran et al. |
| 7,729,940 B2 | 6/2010 | Harvey et al. |
| 7,788,632 B2 | 8/2010 | Kuester et al. |
| 7,801,758 B2 | 9/2010 | Gracie et al. |
| 7,853,468 B2 | 12/2010 | Callahan et al. |
| 7,877,812 B2 | 1/2011 | Koved et al. |
| 7,885,841 B2 | 2/2011 | King |
| 7,966,663 B2 | 6/2011 | Strickland et al. |
| 7,991,559 B2 | 8/2011 | Dzekunov et al. |
| 8,019,881 B2 | 9/2011 | Sandhu et al. |
| 8,146,074 B2 | 3/2012 | Ito et al. |
| 8,156,158 B2 | 4/2012 | Rolls et al. |
| 8,176,334 B2 | 5/2012 | Vainstein |
| 8,504,481 B2 | 8/2013 | Motahari et al. |
| 8,578,036 B1 | 11/2013 | Holfelder et al. |
| 8,583,694 B2 | 11/2013 | Siegel et al. |
| 8,601,591 B2 | 12/2013 | Krishnamurthy et al. |
| 8,612,420 B2 | 12/2013 | Sun et al. |
| 8,612,993 B2 | 12/2013 | Grant et al. |
| 8,683,502 B2 | 3/2014 | Shkedi et al. |
| 8,712,813 B2 | 4/2014 | King |
| 8,805,707 B2 | 8/2014 | Schumann, Jr. et al. |
| 8,805,925 B2 | 8/2014 | Price et al. |
| 8,812,342 B2 | 8/2014 | Barcelo et al. |
| 8,819,253 B2 | 8/2014 | Simeloff et al. |
| 8,826,446 B1 | 9/2014 | Liu et al. |
| 8,914,299 B2 | 12/2014 | Pesci-Anderson et al. |
| 8,943,076 B2 | 1/2015 | Stewart et al. |
| 9,092,796 B2 | 7/2015 | Eversoll et al. |
| 9,094,434 B2 | 7/2015 | Williams et al. |
| 9,152,820 B1 | 10/2015 | Pauley, Jr. et al. |
| 9,158,655 B2 | 10/2015 | Wadhwani et al. |
| 9,172,706 B2 | 10/2015 | Krishnamurthy et al. |
| 9,202,085 B2 | 12/2015 | Mawdsley et al. |
| 9,215,252 B2 | 12/2015 | Smith et al. |
| 9,288,118 B1 | 3/2016 | Pattan |
| 9,338,188 B1 | 5/2016 | Ahn |
| 9,348,802 B2 | 5/2016 | Massand |
| 9,384,357 B2 | 7/2016 | Patil et al. |
| 9,401,900 B2 | 7/2016 | Levasseur et al. |
| 9,424,021 B2 | 8/2016 | Zamir |
| 9,477,660 B2 | 10/2016 | Scott et al. |
| 9,507,960 B2 | 11/2016 | Bell et al. |
| 9,521,166 B2 | 12/2016 | Wilson |
| 9,602,529 B2 | 3/2017 | Jones et al. |
| 9,646,095 B1 | 5/2017 | Gottlieb et al. |
| 9,652,314 B2 | 5/2017 | Mahiddini |
| 9,654,541 B1 | 5/2017 | Kapczynski et al. |
| 9,691,090 B1 | 6/2017 | Barday |
| 9,721,108 B2 | 8/2017 | Krishnamurthy et al. |
| 2002/0161594 A1 | 10/2002 | Bryan et al. |
| 2003/0041250 A1 | 2/2003 | Proudler |
| 2006/0075122 A1 | 4/2006 | Lindskog et al. |
| 2007/0027715 A1 | 2/2007 | Gropper et al. |
| 2007/0157311 A1 | 7/2007 | Meier et al. |
| 2007/0266420 A1 | 11/2007 | Hawkins et al. |
| 2007/0283171 A1 | 12/2007 | Breslin et al. |
| 2008/0028435 A1 | 1/2008 | Strickland et al. |
| 2009/0204452 A1 | 8/2009 | Iskandar et al. |
| 2010/0121773 A1 | 5/2010 | Currier et al. |
| 2010/0333012 A1 | 12/2010 | Adachi et al. |
| 2011/0010202 A1 | 1/2011 | Neale |
| 2012/0102543 A1 | 4/2012 | Kohli et al. |
| 2012/0116923 A1 | 5/2012 | Irving et al. |
| 2012/0259752 A1 | 10/2012 | Agee |
| 2013/0218829 A1 | 8/2013 | Martinez |
| 2013/0311224 A1 | 11/2013 | Heroux et al. |
| 2013/0332362 A1 | 12/2013 | Ciurea |
| 2013/0340086 A1 | 12/2013 | Blom |
| 2014/0006616 A1 | 1/2014 | Aad et al. |
| 2014/0012833 A1 | 1/2014 | Humprecht |
| 2014/0032265 A1 | 1/2014 | Paprocki |
| 2014/0040134 A1 | 2/2014 | Ciurea |
| 2014/0047551 A1 | 2/2014 | Nagasundaram et al. |
| 2014/0089039 A1 | 3/2014 | McClellan |
| 2014/0208418 A1 | 7/2014 | Libin |
| 2014/0278663 A1 | 9/2014 | Samuel et al. |
| 2014/0283027 A1 | 9/2014 | Orona et al. |
| 2014/0337466 A1 | 11/2014 | Li et al. |
| 2015/0066577 A1 | 3/2015 | Christiansen et al. |
| 2015/0106948 A1 | 4/2015 | Holman et al. |
| 2015/0106949 A1 | 4/2015 | Holman et al. |
| 2015/0169318 A1 | 6/2015 | Nash |
| 2015/0229664 A1 | 8/2015 | Hawthorn et al. |
| 2015/0242778 A1 | 8/2015 | Wilcox et al. |
| 2015/0269384 A1 | 9/2015 | Holman et al. |
| 2015/0356362 A1 | 12/2015 | Demos |
| 2016/0048700 A1 | 2/2016 | Stransky-Heilkron |
| 2016/0099963 A1 | 4/2016 | Mahaffey et al. |
| 2016/0162269 A1 | 6/2016 | Pogorelik et al. |
| 2016/0234319 A1 | 8/2016 | Griffin |
| 2016/0321748 A1 | 11/2016 | Mahatma et al. |
| 2016/0364736 A1 | 12/2016 | Maugans, III |
| 2017/0142158 A1 | 5/2017 | Laoutaris et al. |
| 2017/0161520 A1 | 6/2017 | Lockhart, III |
| 2017/0177324 A1 | 6/2017 | Frank et al. |
| 2017/0193624 A1 | 7/2017 | Tsai |
| 2017/0206707 A1 | 7/2017 | Guay et al. |
| 2017/0270318 A1* | 9/2017 | Ritchie ............... G06Q 40/025 |
| 2017/0330197 A1* | 11/2017 | DiMaggio ........... G06Q 30/018 |

OTHER PUBLICATIONS

Written Opinion of the International Searching Authority, dated Jun. 21, 2017, from corresponding International Application No. PCT/US2017/025600.

Office Action, dated Dec. 15, 2016, from corresponding U.S. Appl. No. 15/256,419.

Restriction Requirement, dated Jan. 18, 2017, from corresponding U.S. Appl. No. 15/256,430.

Restriction Requirement, dated Nov. 21, 2016, from corresponding U.S. Appl. No. 15/254,901.

"TRUSTe Announces General Availability of Assessment Manager for Enterprises to Streamline Data Privacy Management with Automation," PRNewswire, Mar. 4, 2015.

www.truste.com (1), 200150207, Internet Archive Wayback Machine, www.archive.org,2_7_2015.

Notice of Allowance, dated Apr. 12, 2017, from corresponding U.S. Appl. No. 15/256,419.

Notice of Allowance, dated May 5, 2017, from corresponding U.S. Appl. No. 15/254,901.

International Search Report, dated Jun. 6, 2017, from corresponding International Application No. PCT/US2017/025605.

International Search Report, dated Jun. 6, 2017, from corresponding International Application No. PCT/US2017/025611.

Written Opinion of the International Searching Authority, dated Jun. 6, 2017, from corresponding International Application No. PCT/US2017/025611.

Written Opinion of the International Searching Authority, dated Jun. 6, 2017, from corresponding International Application No. PCT/US2017/025605.

Ghiglieri, Marco et al.; Personal DLP for Facebook, 2014 IEEE International Conference on Pervasive Computing and Communication Workshops (Percom Workshops); IEEE; Mar. 24, 2014; pp. 629-634.

International Search Report, dated Aug. 15, 2017, from corresponding International Application No. PCT/US2017/036919.

International Search Report, dated Aug. 8, 2017, from corresponding International Application No. PCT/US2017/036889.

International Search Report, dated Aug. 8, 2017, from corresponding International Application No. PCT/US2017/036890.

International Search Report, dated Aug. 8, 2017, from corresponding International Application No. PCT/US2017/036893.

(56) References Cited

OTHER PUBLICATIONS

International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
Notice of Allowance, dated Aug. 18, 2017, from corresponding U.S. Appl. No. 15/619,455.
Office Action, dated Aug. 23, 2017, from corresponding U.S. Appl. No. 15/626,052.
Office Action, dated Jul. 21, 2017, from corresponding U.S. Appl. No. 15/256,430.
Restriction Requirement, dated Jul. 28, 2017, from corresponding U.S. Appl. No. 15/169,658.
Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.
Written Opinion of the International Searching Authority, dated Aug. 15, 2017, from corresponding International Application No. PCT/US2017/036919.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.
Office Action, dated Aug. 24, 2017, from corresponding U.S. Appl. No. 15/619,451.
International Search Report, dated Aug. 21, 2017, from corresponding International Application No. PCT/US2017/036914.
Invitation to Pay Additional Search Fees, dated Aug. 24, 2017, from corresponding International Application No. PCT/US2017/036888.
Office Action, dated Aug. 24, 2017, from corresponding U.S. Appl. No. 15/169,643.
Office Action, dated Aug. 29, 2017, from corresponding U.S. Appl. No. 15/619,237.
Office Action, dated Aug. 30, 2017, from corresponding U.S. Appl. No. 15/619,212.
Written Opinion of the International Searching Authority, dated Aug. 21, 2017, from corresponding International Application No. PCT/US2017/036914.
Office Action, dated Sep. 1, 2017, from corresponding U.S. Appl. No. 15/619,459.
International Search Report, dated Aug. 29, 2017, from corresponding International Application No. PCT/US2017/036898.
International Search Report, dated Sep. 1, 2017, from corresponding International Application No. PCT/US2017/036896.
Office Action, dated Sep. 11, 2017, from corresponding U.S. Appl. No. 15/619,375.
Office Action, dated Sep. 11, 2017, from corresponding U.S. Appl. No. 15/619,478.
Office Action, dated Sep. 19, 2017, from corresponding U.S. Appl. No. 15/671,073.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Written Opinion of the International Searching Authority, dated Aug. 29, 2017, from corresponding International Application No. PCT/US2017/036898.
Written Opinion of the International Searching Authority, dated Sep. 1, 2017, from corresponding International Application No. PCT/US2017/036896.
Office Action, dated Sep. 22, 2017, from corresponding U.S. Appl. No. 15/619,278.
Notice of Allowance, dated Sep. 27, 2017, from corresponding U.S. Appl. No. 15/626,052.
International Search Report, dated Oct. 3, 2017, from corresponding International Application No. PCT/US2017/036912.
Written Opinion of the International Searching Authority, dated Oct. 3, 2017, from corresponding International Application No. PCT/US2017/036912.
International Search Report, dated Oct. 12, 2017, from corresponding International Application No. PCT/US2017/036888.
Written Opinion of the International Searching Authority, dated Oct. 12, 2017, from corresponding International Application No. PCT/US2017/036888.
International Search Report, dated Oct. 20, 2017, from corresponding International Application No. PCT/US2017/036917.
Written Opinion of the International Searching Authority, dated Oct. 20, 2017, from corresponding International Application No. PCT/US2017/036917.
Office Action, dated Nov. 1, 2017, from corresponding U.S. Appl. No. 15/169,658.
Notice of Allowance, dated Nov. 7, 2017, from corresponding U.S. Appl. No. 15/671,073.
Final Office Action, dated Nov. 29, 2017, from corresponding U.S. Appl. No. 15/619,237.
Notice of Allowance, dated Dec. 6, 2017, from corresponding U.S. Appl. No. 15/619,451.
Notice of Allowance, dated Dec. 5, 2017, from corresponding U.S. Appl. No. 15/633,703.
Notice of Allowance, dated Dec. 6, 2017, from corresponding U.S. Appl. No. 15/619,459.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.

* cited by examiner

DATA PROCESSING SYSTEMS FOR MODIFYING PRIVACY CAMPAIGN DATA VIA ELECTRONIC MESSAGING SYSTEMS

CROSS REFERENCE TO RELATED APPLICATIONS

This application is a continuation-in-part of U.S. patent application Ser. No. 15/256,419, filed Sep. 2, 2016, which is a continuation of U.S. patent application Ser. No. 15/169,643, filed May 31, 2016, which claims priority to U.S. Provisional Patent Application Ser. No. 62/317,457, filed Apr. 1, 2016, and this application also claims priority to U.S. Provisional Patent Application Ser. No. 62/360,123, filed Jul. 8, 2016; U.S. Provisional Patent Application Ser. No. 62/353,802, filed Jun. 23, 2016; and U.S. Provisional Patent Application Ser. No. 62/348,695, filed Jun. 10, 2016, the disclosures of which are hereby incorporated by reference in their entirety.

BACKGROUND

Over the past years, privacy and security policies, and related operations have become increasingly important. Breaches in security, leading to the unauthorized access of personal data (which may include sensitive personal data) have become more frequent among companies and other organizations of all sizes. Such personal data may include, but is not limited to, personally identifiable information (PII), which may be information that directly (or indirectly) identifies an individual or entity. Examples of PII include names, addresses, dates of birth, social security numbers, and biometric identifiers such as a person's fingerprints or picture. Other personal data may include, for example, customers' Internet browsing habits, purchase history, or even their preferences (e.g., likes and dislikes, as provided or obtained through social media).

Many organizations that obtain, use, and transfer personal data, including sensitive personal data, have begun to address these privacy and security issues. To manage personal data, many companies have attempted to implement operational policies and processes that comply with legal and industry requirements. Accordingly, there is a need for improved systems and methods to manage personal data in a manner that complies with such policies.

SUMMARY

A computer-implemented data processing method for electronically receiving the input of campaign data related to a privacy campaign and electronically calculating a risk level for the privacy campaign based on the data inputs, according to various embodiments, comprises: (1) displaying on a graphical user interface a prompt to create an electronic record for a privacy campaign, wherein the privacy campaign utilizes personal data collected from at least one or more persons or one or more entities; (2) receiving a command to create an electronic record for the privacy campaign; (3) creating an electronic record for the privacy campaign and digitally storing the record; (4) presenting, on one or more graphical user interfaces, a plurality of prompts for the input of campaign data related to the privacy campaign; and electronically receiving campaign data input by one or more users. In various embodiments, the campaign data identifies: (1) a description of the campaign; (2) one or more types of personal data related to the campaign; (3) a subject from which the personal data was collected; (4) the storage of the personal data; and (5) access to the personal data. In particular embodiments, the computer-implemented data processing method further comprises: (1) processing the campaign data by electronically associating the campaign data with the record for the privacy campaign; (2) receiving, by one or more computer processors, a request to associate an electronic message with the record for the privacy campaign; (3) in response to receiving the request, associating the electronic message with the record for the privacy campaign; (4) digitally storing the campaign data associated with the record for the campaign; and (5) using one or more computer processors, calculating a risk level for the campaign based on the campaign data, In any embodiment described herein, calculating the risk level for the campaign may comprise: (1) electronically retrieving from a database the campaign data associated with the record for the campaign; and (2) electronically determining a plurality of weighting factors for the campaign, wherein the plurality of weighting factors are based upon a plurality of factors including: (A) the nature of the personal data associated with the campaign; (B) the physical location of the personal data associated with the campaign; (C) the length of time that the personal data associated with the campaign will be retained in storage; (D) the type of individual from which the personal data associated with the campaign originated; and (E) the country of residence of the individual from which the personal data associated with the campaign originated. In still other embodiments, calculating the risk level further comprises: (1) electronically assigning a relative risk rating for each of the plurality of factors; (2) electronically calculating a risk level for the campaign based upon the plurality of weighting factors and the relative risk rating for each of the plurality of factors; and (3) digitally storing the risk level associated with the record for the campaign.

A computer-implemented data processing method of electronically modifying a data structure comprising campaign data related to a privacy campaign, in particular embodiments, comprises: (1) receiving, by one or more processors, a request to modify a data structure to include one or more electronic messages, wherein the data structure digitally stores campaign data related to a privacy campaign; (2) in response to receiving the request, modifying, by one or more processors, the data structure to include the one or more electronic messages; and (3) associating, in the data structure, the one or more electronic messages with the campaign data. In various embodiments, the campaign data identifies each of: (1) one or more types of personal data related to the privacy campaign; (2) a subject from which the personal data was collected; (3) a storage location of the personal data; and (4) one or more access permissions related to the personal data.

A computer-implemented data processing method of electronically modifying campaign data related to a particular privacy campaign of a plurality of privacy campaigns, according to some embodiments, comprises: (1) providing, by one or more processors, a software plug-in for installation on a computing device; (2) receiving, by one or more processors, via the software plug-in, a request to modify campaign data for a particular privacy campaign of a plurality of privacy campaigns to include one or more electronic messages; (3) in response to receiving the request, modifying, by one or more processors, the campaign data for the particular privacy campaign to include the one or more electronic messages; and (4) associating, in the data structure, the one or more electronic messages with the campaign data. In various embodiments, the campaign data identifies:

(1) a description of the particular privacy campaign; (2) one or more types of personal data related to the particular privacy campaign; (3) a subject from which the personal data was collected; (4) a storage location of the personal data; and (5) one or more access permissions related to the personal data;

BRIEF DESCRIPTION OF THE DRAWINGS

Various embodiments of a privacy campaign data modification system are described below. In the course of this description, reference will be made to the accompanying drawings, which are not necessarily drawn to scale, and wherein.

DETAILED DESCRIPTION

Figure 1:
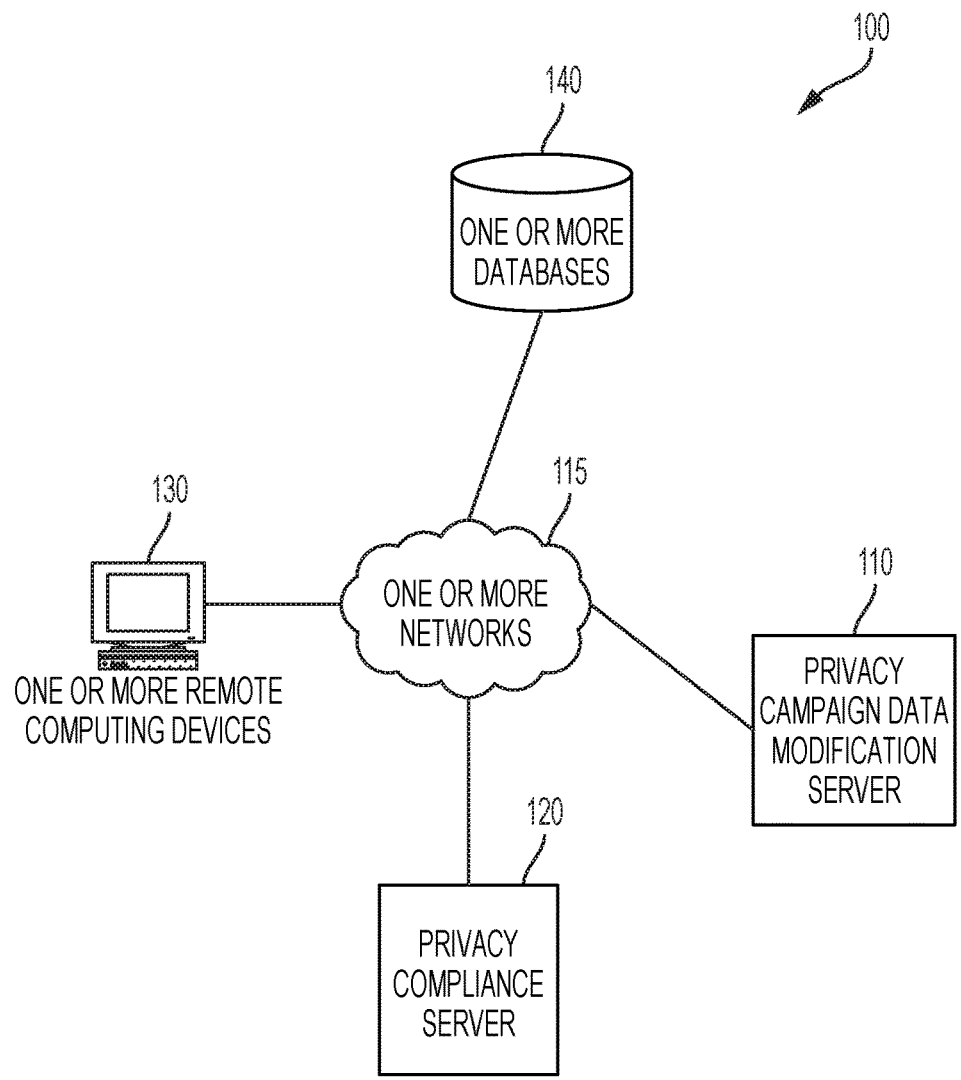
FIG. 1 depicts a privacy campaign data modification system according to particular embodiments.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In various embodiments, a privacy campaign data modification system is configured to store electronic messages in memory and associate those electronic messages with a particular privacy campaign. In particular, a privacy officer or other individual may receive e-mails or other electronic messages that are associated with an existing privacy campaign or an existing privacy impact assessment currently being performed for a particular privacy campaign. In various embodiments, it may be necessary to store and maintain the electronic messages for any suitable reason (e.g., record keeping, auditing, etc.)

In particular embodiments, the system is configured to allow users to automatically attach an electronic message to an existing privacy campaign, data flow, and/or privacy assessment. The system may further be configured to enable a user to automatically store an electronic message within a data store associated with the system, and tag the electronic message as "unassigned" for later assignment to an existing or potential future privacy campaign.

In particular embodiments, the system may, for example, be adapted to enable a user to store an electronic message and associate it with a particular privacy campaign using: (1) a browser plug-in extension that is configured to capture webmail; (2) a software plug-in for an electronic messaging software application (e.g., Outlook, iMessage, etc.); (3) an integrated e-mail alias to which the user may forward the electronic message to; and/or (4) any other suitable configuration. In various embodiments, the software plug-in may be configured to capture data from any browsable document source, such as SharePoint, file repository, FTP, HTTP, etc.

In various embodiments, a privacy campaign may include any undertaking by a particular organization (e.g., such as a project or other activity) that includes the collection, entry, and/or storage (e.g., in memory) of any privacy information or personal data associated with one or more individuals. This personal data may include, for example, for an individual: (1) name; (2) address; (3) telephone number; (4) e-mail address; (5) social security number; (6) information associated with one or more credit accounts (e.g., credit card numbers); (7) banking information; (8) location data; (9) internet search history; (10) account data; and (11) any other suitable personal information discussed herein.

As generally discussed above, a particular organization may be required to implement operational policies and processes to comply with one or more legal requirements in handling such personal data. A particular organization may further take steps to comply with one or more industry best practices. In particular embodiments, these operational policies and processes may include, for example: (1) storing personal data in a suitable location; (2) limiting access to the personal data to only suitable individuals or entities within the origination or external to the organization; (3) limiting a length of time for which the data will be stored; and (4) any other suitable policy to ensure compliance with any legal or industry guidelines. In particular embodiments, the legal or industry guidelines may vary based at least in part on, for example: (1) the type of data being stored; (2) an amount of data; (3) whether the data is encrypted; (4) etc.

For example, a particular organization's privacy compliance system may store information related to a plurality of privacy campaigns that the particular organization has undertaken. Each particular privacy campaign may include the receipt or entry and subsequent storage of personal data associated with one or more individuals as part of the privacy campaign. An exemplary privacy campaign, may, for example, include the collection and storage of the organization's employees' names, contact information, banking information, and social security numbers for use by the organization's accounting department for payroll purposes.

In relation to each particular privacy campaign that an organization may undertake, a privacy compliance system may be utilized to determine a risk level of a particular privacy campaign and to establish an audit schedule for the particular privacy campaign based on the risk level. The risk level may, for example, be determined based on various factors related to the operational policies and processes described above in combination with one or more weighting factors and associated risk ratings for such factors. In any embodiment described herein, the privacy campaign data modification system may be utilized in the context of a privacy compliance system to modify an audit schedule or affect a calculated risk level for a particular privacy campaign. For example, the system may: (1) scan the contents of one or more electronic messages stored and maintained by the system for a particular privacy campaign; (2) analyze the contents; and (3) modify an audit schedule or risk level for the particular privacy campaign based at least in part on the analysis.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a Privacy Campaign Data Modification System 100 according to a particular embodiment. In various embodiments, the Privacy Campaign Data Modification System 100 is part of a Privacy Compliance System, or other system, which may, for example, be associated with a particular organization and be configured to ensure compliance with one or more legal or industry regulations related to the collection and storage of personal data. In some embodiments, the Privacy Campaign Data Modification System 100 is configured to store and maintain electronic messages associated with particular privacy campaigns for record keeping and auditing purposes.

As may be understood from FIG. 1, the Privacy Campaign Data Modification System 100 includes one or more computer networks 115, a Privacy Campaign Data Modification Server 110, a Privacy Compliance Server 120, one or more remote computing devices 130 (e.g., a desktop computer, laptop computer, tablet computer, smartphone, etc.), and One or More Databases 140. In particular embodiments, the one or more computer networks 115 facilitate communication between the Privacy Campaign Data Modification Server 110, Privacy Compliance Server 120, one or more remote computing devices 130 (e.g., a desktop computer, laptop computer, tablet computer, etc.), and one or more databases 140.

The one or more computer networks 115 may include any of a variety of types of wired or wireless computer networks such as the Internet, a private intranet, a public switch telephone network (PSTN), or any other type of network. The communication link between Privacy Campaign Data Modification Server 110 and Database 140 may be, for example, implemented via a Local Area Network (LAN) or via the Internet. In other embodiments, the Database 140 may be stored on any suitable server described herein.

Figure 2:
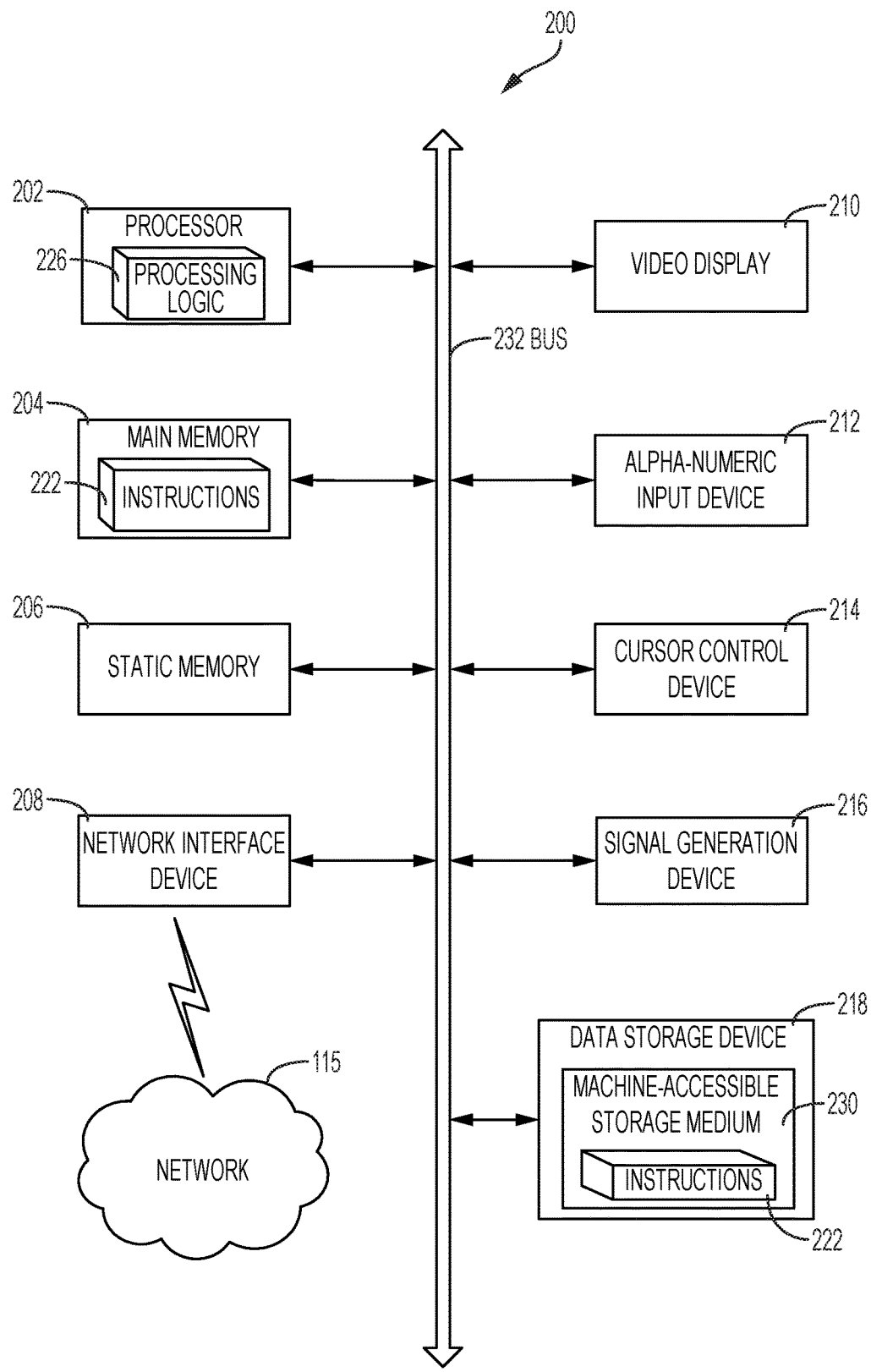
FIG. 2 is a schematic diagram of a computer (such as the privacy campaign data modification server 110, or one or more remote computing devices 130) that is suitable for use in various embodiments of the privacy campaign data modification system shown in FIG. 1.

FIG. 2 illustrates a diagrammatic representation of a computer 200 that can be used within the Privacy Campaign Data Modification System 100, for example, as a client computer (e.g., one or more remote computing devices 130 shown in FIG. 1), or as a server computer (e.g., Privacy Campaign Data Modification Server 110 shown in FIG. 1). In particular embodiments, the computer 200 may be suitable for use as a computer within the context of the Privacy Campaign Data Modification System 100 that is configured to monitor a user's system inputs to ascertain whether any of those inputs are abnormal.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The Computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 200 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software instructions 222) embodying any one or more of the methodologies or functions described herein. The software instructions 222 may also reside, completely or at least partially, within main memory 204 and/or within processing device 202 during execution thereof by computer 200—main memory 204 and processing device 202 also constituting computer-accessible storage media. The software instructions 222 may further be transmitted or received over a network 115 via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Exemplary System Platform

Various embodiments of a privacy campaign data modification system 100 may be implemented in the context of any suitable system (e.g., a privacy compliance system). For example, the privacy campaign data modification system 100 may be implemented to enable users to modify campaign data for a particular privacy campaign to include one or more electronic messages (e.g., e-mails and attachments, etc.) In particular embodiments, the system may implement the module in order to at least partially ensure compliance with one or more regulations (e.g., legal requirements) related to the collection and/or storage of personal data by, for example: (1) adjusting a risk level of the particular privacy campaign based on contents of the electronic messages; and/or (2) modifying an audit schedule for the particular privacy campaign based on the contents of the electronic messages.

Various aspects of the system's functionality may be executed by certain system modules, including a Privacy Campaign Data Modification Module 300. This module is discussed in greater detail below. Although this module is presented as a series of steps, it should be understood in light of this disclosure that various embodiments of the Privacy Campaign Data Modification Module 300 described herein may perform the steps described below in an order other than in which they are presented. In still other embodiments, the Privacy Campaign Data Modification Module 300 may omit certain steps described below. In various other embodiments, the Privacy Campaign Data Modification Module 300 may perform steps in addition to those described.

Privacy Campaign Data Modification Module

In particular embodiments, a Privacy Campaign Data Modification Module 300 is configured to: (1) store one or more electronic messages in computer memory and associate the electronic messages with a particular privacy campaign; (2) calculate an updated risk level for the particular privacy campaign based on one or more pieces of content in the one or more electronic messages; and/or (3) modify an audit schedule for the particular privacy campaign based on the one or more pieces of content.

Figure 3:
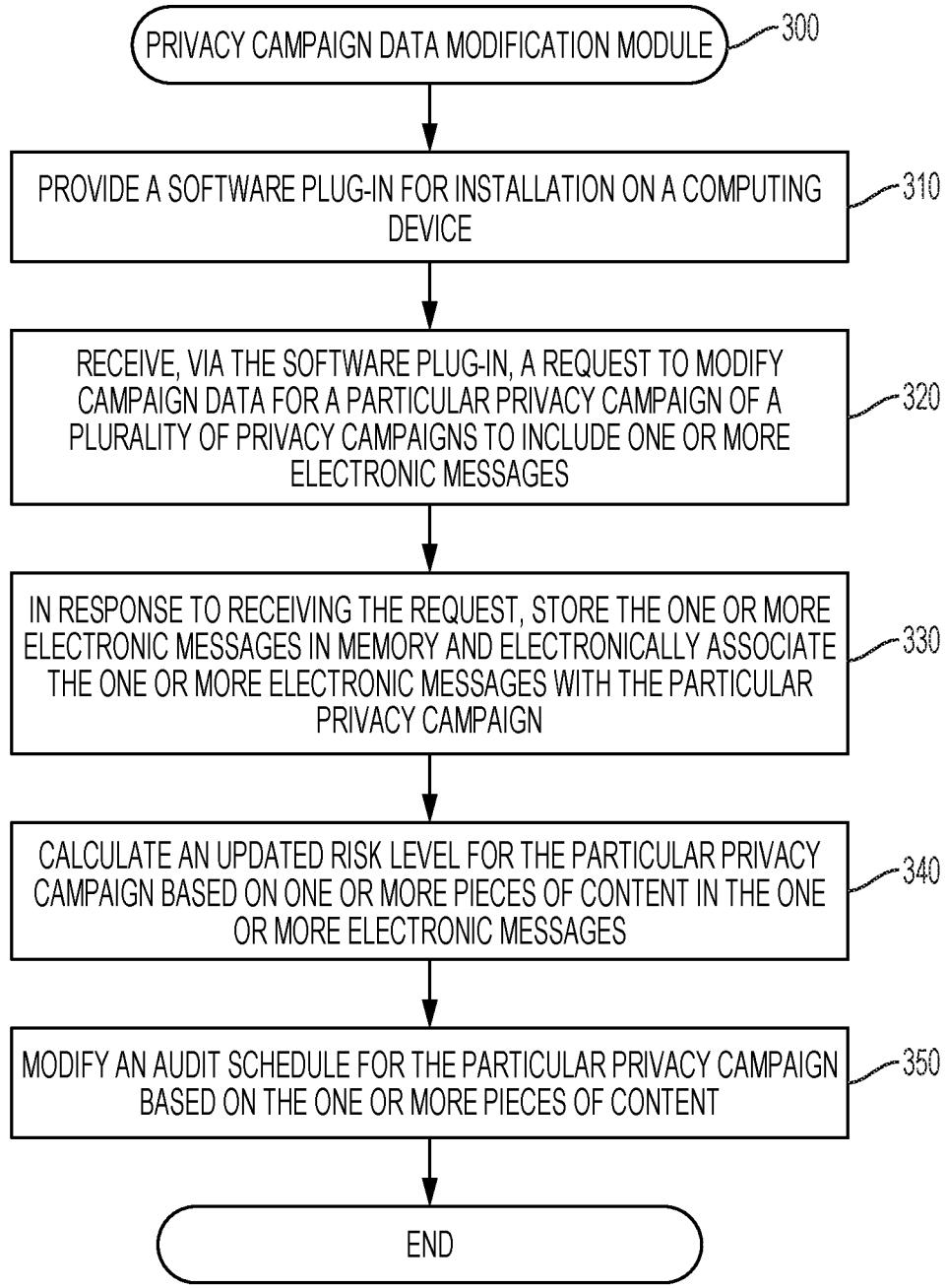
FIG. 3 is a flowchart showing an example of a process performed by the Privacy Campaign Data Modification Module according to particular embodiments.

Turning to FIG. 3, in particular embodiments, when executing the Privacy Campaign Data Modification Module 300, the system begins, at Step 310, providing a software plug-in for installation on a computing device. In particular embodiments, the software plug-in comprises a browser plug-in extension that is configured to capture and store webmail accessed via the browser. In still other embodiments, the software plug-in comprises a plug-in configured as an add-on to an electronic messaging software application (e.g., an e-mail application such as Outlook). In still other embodiments, the software application may include a plug-in directly with a messaging host, such as via Exchange, Office 365 or Google Webmail.

In various embodiments, the system is configured to provide the software plug-in via a suitable centralized software application repository (e.g., the Apple App Store, Google Play store, etc.). In still other embodiments, the system is configured to provide the software plug-in for download via a suitable website or server. In various embodiments, the system is configured to provide the software plug-in for installation on any suitable computing device (e.g., desktop computer, laptop computer, smartphone, tablet, etc.). In various embodiments, the software plug-in is configured to serve as an add-on to an existing software application on the computing device and facilitate the storage of particular electronic messages (e.g., on one or more remote servers) and association of the particular electronic messages with a particular privacy campaign (e.g., in response to a request from a user.

Continuing to Step 320, the system receives, via the software plug-in, a request to modify campaign data for a particular privacy campaign of a plurality of privacy campaigns to include one or more electronic messages. As may be understood in light of this disclosure, a particular privacy campaign may include any activity undertaken by an entity that involves the collection and/or storage of personal data. U.S. patent application Ser. No. 15/256,419, entitled "Data Processing Systems and Methods for Operationalizing Privacy Compliance and Assessing the Risk of Various Respective Privacy Campaigns," and filed Sep. 2, 2016 describes the creation of a record for a particular privacy campaign that includes various campaign data, and is hereby incorporated herein in its entirety.

In various embodiments, the campaign data may be representative of one or more attributes related to the personal data collected as part of the campaign. In other embodiments, the campaign data may include any other information related to the particular privacy campaign with which it is associated. As may be understood in light of this disclosure, a privacy officer or other individual may receive one or more electronic communications (e.g., e-mails or other electronic messages) that are associated with or otherwise related to an existing privacy campaign or privacy impact assessment related to a particular privacy campaign. The privacy officer or other individual may desire to store and maintain such electronic communications for any suitable purpose (e.g., record keeping, auditing, etc.).

In various embodiments, it may be preferable to store such electronic communications in a location other than an e-mail server or other location where the electronic communication was received (e.g., such as in a centralized location). Accordingly, at Step 320, the system may receive the request to modify campaign data (e.g., or an electronic record) for a particular privacy campaign to include the one or more electronic messages. In various embodiments, the system is configured to receive the request in response to selection, by a user, of an indicia for storing the electronic message and associating the electronic message with the particular privacy camping. In particular embodiments, the system may receive a name or unique identifier associated with the particular privacy campaign as part of the request. For example, when initiating a new privacy campaign (e.g., as described in U.S. patent application Ser. No. 15/256,419), the system may assign a unique identifier (e.g., string, codename, etc.) to the privacy campaign. The system may, in response to receiving a request to modify campaign data for a particular privacy campaign of the plurality of privacy campaigns, provide a listing of the plurality of privacy campaigns (e.g., as a listing of the unique identifiers for each of the plurality of privacy campaigns via the software plug-in) from which a user may select the particular privacy campaign.

Continuing to Step 330, in response to receiving the request, the system is configured to store the one or more electronic messages in memory and electronically associate the one or more electronic messages with the particular privacy campaign. In particular embodiments, the system is configured to store the one or more electronic messages in any suitable location (e.g., in the One or More Databases 140 or on the Privacy Compliance Server 120 shown in FIG. 1). In still other embodiments, the system is configured to store the one or more electronic messages as part of an electronic record for the particular privacy campaign.

In various embodiments, the system associates the one or more messages with the particular privacy campaign such that a user may view a listing of messages associated with the particular privacy campaign at a later time. For example, the electronic association of the one or more messages with the particular privacy campaign by the system may enable a user to later retrieve the one or more messages by requesting to view any messages associated with the particular campaign.

In particular embodiments, the system may automatically determine the particular privacy campaign with which the associate the one or more electronic messages. For example, the system may determine, based on one or more keywords or unique identifiers within the one or more electronic messages that the one or more electronic messages are associated with the particular privacy campaign.

Returning to Step 340, the system is configured to calculate an updated risk level for the particular privacy campaign based on one or more pieces of content in the one or more electronic messages. U.S. patent application Ser. No. 15/256,419 describes the calculation of a risk level for a particular privacy campaign using the determination of weighting factors and assignment of relative risk ratings for each of the weighting factors. In particular embodiments in which the system is configured to calculate an updated risk level for a particular privacy campaign, the system may, for example: (1) scan the contents of the one or more messages; (2) identify one or more keywords in the contents of the one or more messages; (3) determine, based at least in part on the one or more keywords identified in the one or more messages, whether to modify a risk level for the particular privacy campaign; and (4) in response to determining to modify the risk level: (A) modifying at least one of the plurality of weighting factors and/or the relative risk rating for at least one of the plurality of weighting factors; and (B) calculating the updated risk level based upon the modified plurality of weighting factors and/or the modified relative risk rating. The system may, for example, determine to modify the risk level for the privacy campaign based at least in part on one or more keywords identified in the one or more electronic messages.

Continuing to Step 350, the system is configured to modify an audit schedule for the particular privacy campaign based on the one or more pieces of content (e.g., based on the calculated updated risk level). As may be understood in light of this disclosure and the disclosures incorporated herein, the nature of a particular privacy campaign may dictate a frequency with which the particular privacy campaign should be audited in order to ensure compliance with legal and industry standards related to the collection and storage of personal data as part of the privacy campaign. Particular electronic messages that are associated with a particular privacy campaign may contain content that may indicate a reduction in risk of a particular privacy campaign. This may, for example, indicate that the audit frequency for the particular privacy campaign should be reduced (e.g., in order to conserve resources on unnecessary audits).

For example, if the system determines at Step 340, in response to scanning the content of the one or more electronic messages that the one or more messages indicate that the particular privacy campaign is winding down soon, the system may determine that the updated risk level is lower than a previous risk level. In this example, the system may then automatically modify the audit schedule for the particular privacy campaign to reduce a frequency of scheduled audits. As another example, the system may determine, based on content within the one or more messages, that the system does not have complete information regarding the particular privacy campaign. This may include, for example: (1) missing information related to the physical storage of personal data (e.g., location, duration, etc.); (2) imprecise information related to a type of personal data collected (e.g., the electronic message may include discussion of social security numbers where social security numbers are not indicated as being collected as part of the privacy campaign; and/or (3) any other suitable indication within the electronic message that may raise a red flag regarding the campaign. In this example, the system may increase a frequency of auditing for the particular privacy campaign, flag it for an immediate audit, or take any other suitable action.

Exemplary User Experience

Figure 4:
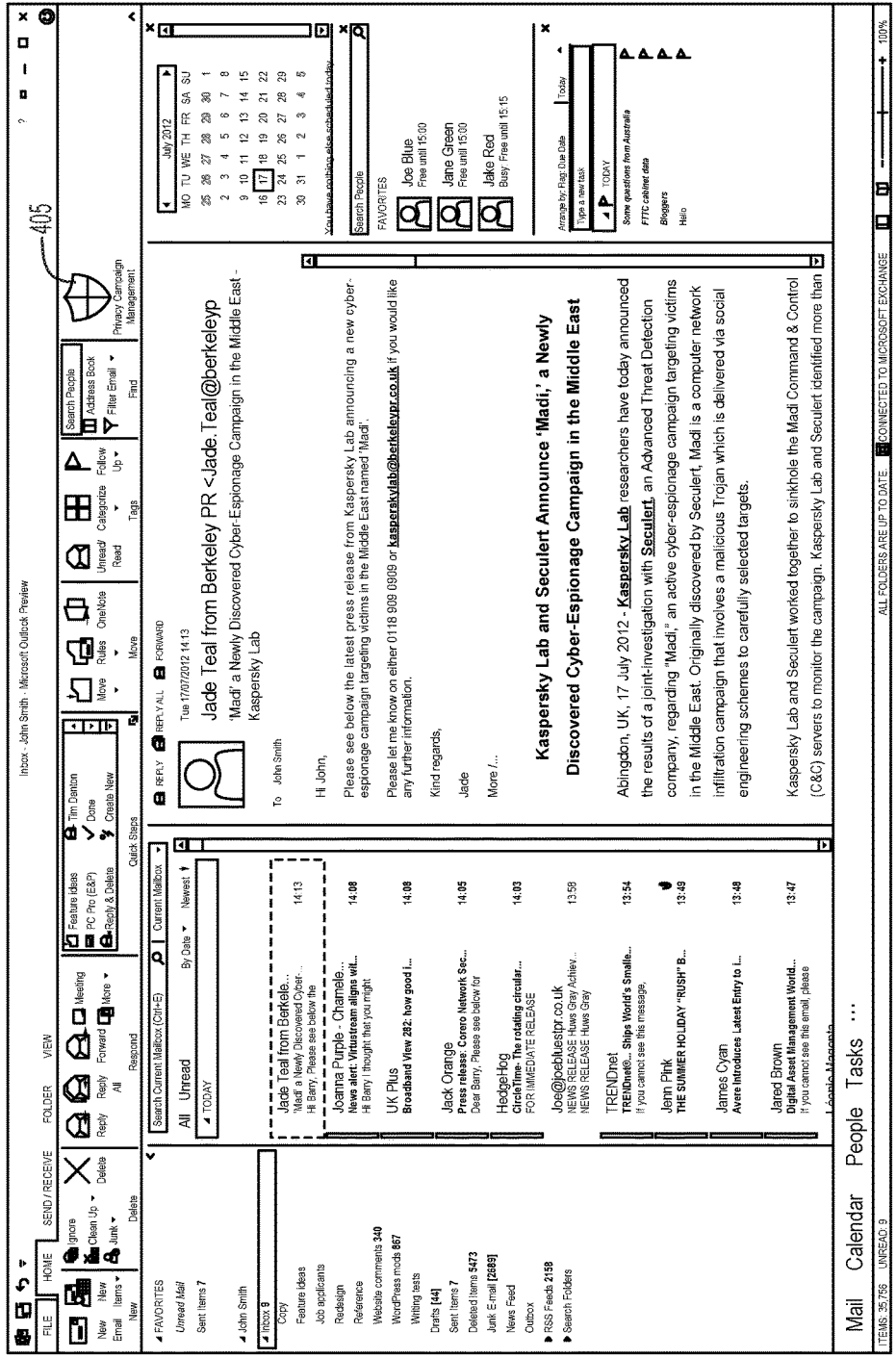
FIG. 4 depicts an exemplary screen display and graphical user interface (GUI) according to various embodiments of the system, which may display information associated with the system or enable access to or interaction with the system by one or more users.

FIG. 4 depicts an exemplary screen display that a user may encounter related to the system described herein. In the exemplary screen display 400 shown in FIG. 4, the system is embodied as a software plug-in for an electronic messaging application (e.g., Microsoft Outlook). As may be understood from this figure, the software plug-in includes a Privacy Campaign Management indicia 405. When using the software plug-in to store an electronic message (e.g., in a remote location) and associate the electronic message with a particular privacy campaign, the user may, for example, select the desired electronic message and then select the Privacy Campaign Management indicia 405.

The system may, in response to selection, by the user, of the Privacy Campaign Management indicia 405, provide the user with a listing of a plurality of active privacy campaigns from which to select the particular privacy campaign. The listing may include, for example, one or more formal names for each of the plurality of privacy campaigns, one or more unique identifiers for each of the plurality of privacy campaigns, one or more short names for each of the plurality of privacy campaigns, or any other suitable listing from which the user may identify and select the desired particular privacy campaign. In response to the user selecting the particular privacy campaign, the system may then be configured to store the electronic message in memory and electronically associate the electronic message with the particular privacy campaign.

In other embodiments, the system may, in response to selection, by the user, of the Privacy Campaign Management indicia 405, substantially automatically determine the particular privacy campaign with which the electronic message should be associated. In such embodiments, the system may scan one or more portions of the electronic message (e.g., e-mail) to identify one or more unique identifiers or keywords associated with the particular privacy campaign. For example, the system may identify the name of the particular privacy campaign in a subject line of the electronic message (e.g., or in the body).

Alternative Embodiments

Various embodiments of a system for modifying privacy campaign data may include features in addition to those described above. Various alternative embodiments of such a system are described below.

Automated Generation of Privacy Campaign E-mail Alias and Handling of Messages Received via Alias In particular embodiments, when initiating a new privacy campaign, the system is configured to substantially automatically generate an e-mail alias and associate the e-mail alias with the new privacy campaign. In such embodiments, the system may be configured to store any e-mails forwarded to the e-mail alias and associate such e-mails with the new privacy campaign. For example, a user may desire to maintain a particular e-mail that is associated with the new privacy campaign. Rather than utilizing any software application or plug-in, the user may simply forward the e-mail to the alias associated with the new privacy campaign. The system may then automatically store any e-mails received by the e-mail alias via forwarding (e.g., along with any attachments) and associate them in memory with the new privacy campaign.

Storage of Unassigned Electronic Messages

In particular embodiments, the system may receive a request to maintain (e.g., store) one or more electronic messages for later association with a particular privacy campaign or store the one or more electronic messages for later association with a particular privacy campaign that does not yet exist in the system (e.g., a planned privacy campaign). In such embodiments, the system may be configured to store the one or more electronic message in a suitable location and tag the one or more electronic messages as unassigned. In such embodiments, the system may be configured to prompt a user to associate any unassigned electronic messages with a new privacy campaign upon its creation. In still other embodiments, the system is configured to receive an identification of the particular privacy campaign with which to associate a particular electronic message at a time subsequent to an initial storage of the particular electronic message.

Additional Aspects of System

1. Standardized and Customized Assessment of Vendors' Compliance with Privacy and/or Security Policies In particular embodiments, the system may be adapted to: (1) facilitate the assessment of one or more vendors' compliance with one or more privacy and/or security policies; and (2) allow organizations (e.g., companies or other organizations) who do business with the vendors to create, view and/or apply customized criteria to information periodically collected by the system to evaluate each vendor's compliance with one or more of the company's specific privacy and/or security policies. In various embodiments, the system may also flag any assessments, projects, campaigns, and/or data flows that the organization has documented and maintained within the system if those data flows are associated with a vendor that has its rating changed so that the rating meets certain criteria (e.g., if the vendor's rating falls below a predetermined threshold).

In particular embodiments:
  The system may include an online portal and community that includes a listing of all supported vendors.
  An appropriate party (e.g., the participating vendor or a member of the on-line community) may use the system to submit an assessment template that is specific to a particular vendor.
    If the template is submitted by the vendor itself, the template may be tagged in any appropriate way as "official"
    An instance for each organization using the system (i.e., customer) is integrated with this online community/portal so that the various assessment templates can be directly fed into that organization's instance of the system if the organization wishes to use it.
  Vendors may subscribe to a predetermined standardized assessment format.
    Assessment results may also be stored in the central community/portal.
    A third party privacy and/or security policy compliance assessor, on a schedule, may (e.g., periodically) complete the assessment of the vendor.
    Each organization using the system can subscribe to the results (e.g., once they are available).
    Companies can have one or more customized rules set up within the system for interpreting the results of assessments in their own unique way. For example:
      Each customer can weight each question within an assessment as desired and set up addition/multiplication logic to determine an aggregated risk score that takes into account the customized weightings given to each question within the assessment.
      Based on new assessment results—the system may notify each customer if the vendor's rating falls, improves, or passes a certain threshold.
      The system can flag any assessments, projects, campaigns, and/or data flows that the customer has documented and maintained within the system if those data flows are associated with a vendor that has its rating changed.

2. Privacy Policy Compliance System that Facilitates Communications with Regulators (including translation aspect)

In particular embodiments, the system is adapted to interface with the computer systems of regulators (e.g., government regulatory agencies) that are responsible for approving privacy campaigns. This may, for example, allow the regulators to review privacy campaign information directly within particular instances of the system and, in some embodiments, approve the privacy campaigns electronically.

In various embodiments, the system may implement this concept by:
- Exporting relevant data regarding the privacy campaign, from an organization's instance of the system (e.g., customized version of the system) in standardized format (e.g., PDF or Word) and sending the extracted data to an appropriate regulator for review (e.g., in electronic or paper format).
  - Either regular provides the format that the system codes to, or the organization associated with the system provides a format that the regulators are comfortable with.
- Send secure link to regulator that gives them access to comment and leave feedback
  - Gives the regulator direct access to the organization's instance of the system with a limited and restricted view of just the projects and associated audit and commenting logs the organization needs reviewed.
  - Regulator actions are logged historically and the regulator can leave guidance, comments, and questions, etc.
- Have portal for regulator that securely links to the systems of their constituents.

Details:
- When submitted—the PIAs are submitted with requested priority—standard or expedited.
- DPA specifies how many expedited requests individuals are allowed to receive.
- Either the customer or DPA can flag a PIA or associated comments/guidance on the PIA with "needs translation" and that can trigger an automated or manual language translation.
- Regulator could be a DPA "data protection authority" in any EU country, or other country with similar concept like FTC in US, or OPC in Canada.

3. Systems/Methods for Measuring the Privacy Maturity of a Business Group within an Organization.

In particular embodiments, the system is adapted for automatically measuring the privacy of a business group, or other group, within a particular organization that is using the system. This may provide an automated way of measuring the privacy maturity, and one or more trends of change in privacy maturity of the organization, or a selected sub-group of the organization.

In various embodiments, the organization using the system can customize one or more algorithms used by the system to measure the privacy maturity of a business group (e.g., by specifying one or more variables and/or relative weights for each variable in calculating a privacy maturity score for the group). The following are examples of variables that may be used in this process:
- Issues/Risks found in submitted assessments that are unmitigated or uncaught prior to the assessment being submitted to the privacy office
  - % of privacy assessments with high issues/total assessments
  - % with medium
  - % with low
- Size and type of personal data used by the group
  - Total assessments done
  - Number of projects/campaigns with personal data
  - Amount of personal data
  - Volume of data transfers to internal and external parties
- Training of the people in the group
  - Number or % of individuals who have watched training, readings, or videos
  - Number or % of individuals who have completed quizzes or games for privacy training
  - Number or % of individuals who have attended privacy events either internally or externally
  - Number or % of individuals who are members of IAPP
  - Number or % of individuals who have been specifically trained in privacy either internally or externally, formally (IAPP certification) or informally
  - Usage of an online version of the system, or mobile training or communication portal that customer has implemented
- Other factors 4. Automated Assessment of Compliance (scan app or website to determine behavior/compliance with privacy policies)

In various embodiments, instead of determining whether an organization complies with the defined parameters of a privacy campaign by, for example, conducting an audit as described above (e.g., by asking users to answer questions regarding the privacy campaign, such as "What is collected" "what cookies are on your website", etc.), the system may be configured to automatically determine whether the organization is complying with one or more aspects of the privacy policy.

For example, during the audit process, the system may obtain a copy of a software application (e.g., an "app") that is collecting and/or using sensitive user information, and then automatically analyze the app to determine whether the operation of the app is complying with the terms of the privacy campaign that govern use of the app.

Similarly, the system may automatically analyze a website that is collecting and/or using sensitive user information to determine whether the operation of the web site is complying with the terms of the privacy campaign that govern use of the web site.

In regard to various embodiments of the automatic application-analyzing embodiment referenced above:
- The typical initial questions asked during an audit may be replaced by a request to "Upload your app here".
  - After the app is uploaded to the system, the system detects what privacy permissions and data the app is collecting from users.
  - This is done by having the system use static or behavioral analysis of the application, or by having the system integrate with a third party system or software (e.g., Veracode), which executes the analysis.
  - During the analysis of the app, the system may detect, for example, whether the app is using location services to detect the location of the user's mobile device.
  - In response to determining that the app is collecting one or more specified types of sensitive information (e.g., the location of the user's mobile device), the system may automatically request follow up information from the user by posing one or more questions to the user, such as:
    - For what business reason is the data being collected?
    - How is the user's consent given to obtain the data?
    - Would users be surprised that the data is being collected?
    - Is the data encrypted at rest and/or in motion?
    - What would happen if the system did not collect this data? What business impact would it have?

In various embodiments, the system is adapted to allow each organization to define these follow-up questions, but the system asks the questions (e.g., the same questions, or a customized list of questions) for each privacy issue that is found in the app.

In various embodiments, after a particular app is scanned a first time, when the app is scanned, the system may only detect and analyze any changes that have been made to the app since the previous scan of the app.

In various embodiments, the system is adapted to (optionally) automatically monitor (e.g., continuously monitor) one or more online software application marketplaces (such as Microsoft, Google, or Apple's App Store) to determine whether the application has changed. If so, the system may, for example: (1) automatically scan the application as discussed above; and (2) automatically notify one or more designated individuals (e.g., privacy office representatives) that an app was detected that the business failed to perform a privacy assessment on prior to launching the application.

In regard to various embodiments of the automatic application-analyzing embodiment referenced above:

The system prompts the user to enter the URL of the web site to be analyzed, and, optionally, the URL to the privacy policy that applies to the web site.

The system then scans the website for cookies, and/or other tracking mechanisms, such as fingerprinting technologies and/or 3rd party SDKs.

The system may then optionally ask the user to complete a series of one or more follow-up questions for each of these items found during the scan of the website.

This may help the applicable privacy office craft a privacy policy to be put on the website to disclose the use of the tracking technologies and SDK's used on the website.

The system may then start a continuous monitoring of the website site to detect whether any new cookies, SDKs, or tracking technologies are used. In various embodiments, the system is configured to, for example, generate an alert to an appropriate individual (e.g., a designated privacy officer) to inform them of the change to the website. The privacy officer may use this information, for example, to determine whether to modify the privacy policy for the website or to coordinate discontinuing use of the new tracking technologies and/or SDK's.

In various embodiments, the system may also auto-detect whether any changes have been made to the policy or the location of the privacy policy link on the page and, in response to auto-detecting such changes, trigger an audit of the project.

It should be understood that the above methods of automatically assessing behavior and/or compliance with one or more privacy policies may be done in any suitable way (e.g., ways other than website scanning and app scanning). For example, the system may alternatively, or in addition, automatically detect, scan and/or monitor any appropriate technical system(s) (e.g., computer system and/or system component or software), cloud services, apps, websites and/or data structures, etc.

5. System Integration with DLP Tools.

DLP tools are traditionally used by information security professionals. Various DLP tools discover where confidential, sensitive, and/or personal information is stored and use various techniques to automatically discover sensitive data within a particular computer system—for example, in emails, on a particular network, in databases, etc. DLP tools can detect the data, what type of data, the amount of data, and whether the data is encrypted. This may be valuable for security professionals, but these tools are typically not useful for privacy professionals because the tools typically cannot detect certain privacy attributes that are required to be known to determine whether an organization is in compliance with particular privacy policies.

For example, traditional DLP tools cannot typically answer the following questions:

Who was the data collected from (data subject)?
Where are those subjects located?
Are they minors?
How was consent to use the data received?
What is the use of the data?
Is the use consistent with the use specified at the time of consent?
What country is the data stored in and/or transferred to?
Etc.

In various embodiments, the system is adapted to integrate with appropriate DLP and/or data discovery tools (e.g., INFORMATICA) and, in response to data being discovered by those tools, to show each area of data that is discovered as a line-item in a system screen via integration.

The system may do this, for example, in a manner that is similar to pending transactions in a checking account that have not yet been reconciled.

A designated privacy officer may then select one of those—and either match it up (e.g., reconcile it) with an existing data flow or campaign in the system OR trigger a new assessment to be done on that data to capture the privacy attributes and data flow.

6. System for Generating an Organization's Data Map by Campaign, by System, or by Individual Data Attributes.

In particular embodiments, the system may be adapted to allow users to specify various criteria, and then to display, to the user, any data maps that satisfy the specified criteria. For example, the system may be adapted to display, in response to an appropriate request: (1) all of a particular customer's data flows that are stored within the system; (2) all of the customer's data flows that are associated with a particular campaign; and/or (3) all of the customer's data flows that involve a particular address.

Similarly, the system may be adapted to allow privacy officers to document and input the data flows into the system in any of a variety of different ways, including:

Document by process
    The user initiates an assessment for a certain business project and captures the associated data flows (including the data elements related to the data flows and the systems they are stored in).
Document by element
    The user initiates an audit of a data element—such as SSN—and tries to identify all data structures associated with the organization that include the SSN. The system may then document this information (e.g., all of the organization's systems and business processes that involve the business processes.)

Document by system

The user initiates an audit of a database, and the system records, in memory, the results of the audit.

7. Privacy Policy Compliance System that Allows Users to Attach Emails to Individual Campaigns.

Privacy officers frequently receive emails (or other electronic messages) that are associated with an existing privacy assessment or campaign, or a potential future privacy assessment. For record keeping and auditing purposes, the privacy officer may wish to maintain those emails in a central storage location, and not in email. In various embodiments, the system is adapted to allow users to automatically attach the email to an existing privacy assessment, data flow, and/or privacy campaign. Alternatively or additionally, the system may allow a user to automatically store emails within a data store associated with the system, and to store the emails as "unassigned", so that they may later be assigned to an existing privacy assessment, data flow, and/or privacy campaign.

In various embodiments, the system is adapted to allow a user to store an email using:
- a browser plugin-extension that captures webmail;
- a Plug-in directly with office 365 or google webmail (or other suitable email application);
- a Plug-in with email clients on computers such as Outlook;
- via an integrated email alias that the email is forwarded to; or
- any other suitable configuration 8. Various Aspects of Related Mobile Applications In particular embodiments, the system may use a mobile app (e.g., that runs on a particular mobile device associated by a user) to collect data from a user. The mobile app may be used, for example, to collect answers to screening questions. The app may also be adapted to allow users to easily input data documenting and/or reporting a privacy incident. For example, the app may be adapted to assist a user in using their mobile device to capture an image of a privacy incident (e.g., a screen shot documenting that data has been stored in an improper location, or that a printout of sensitive information has been left in a public workspace within an organization.)

The mobile app may also be adapted to provide incremental training to individuals. For example, the system may be adapted to provide incremental training to a user (e.g., in the form of the presentation of short lessons on privacy). Training sessions may be followed by short quizzes that are used to allow the user to assess their understanding of the information and to confirm that they have completed the training.

9. Automatic Generation of Personal Data Inventory for Organization

In particular embodiments, the system is adapted to generate and display an inventory of the personal data that an organization collects and stores within its systems (or other systems). As discussed above, in various embodiments, the system is adapted to conduct privacy impact assessments for new and existing privacy campaigns. During a privacy impact assessment for a particular privacy campaign, the system may ask one or more users a series of privacy impact assessment questions regarding the particular privacy campaign and then store the answers to these questions in the system's memory, or in memory of another system, such a third-party computer server.

Such privacy impact assessment questions may include questions regarding: (1) what type of data is to be collected as part of the campaign; (2) who the data is to be collected from; (3) where the data is to be stored; (4) who will have access to the data; (5) how long the data will be kept before being deleted from the system's memory or archived; and/or (6) any other relevant information regarding the campaign.

The system may store the above information, for example, in any suitable data structure, such as a database. In particular embodiments, the system may be configured to selectively (e.g., upon request by an authorized user) generate and display a personal data inventory for the organization that includes, for example, all of the organization's current active campaigns, all of the organization's current and past campaigns, or any other listing of privacy campaigns that, for example, satisfy criteria specified by a user. The system may be adapted to display and/or export the data inventory in any suitable format (e.g., in a table, a spreadsheet, or any other suitable format).

10. Integrated/Automated Solution for Privacy Risk Assessments

Continuing with Concept 9, above, in various embodiments, the system may execute multiple integrated steps to generate a personal data inventory for a particular organization. For example, in a particular embodiment, the system first conducts a Privacy Threshold Assessment (PTA) by asking a user a relatively short set of questions (e.g., between 1 and 15 questions) to quickly determine whether the risk associated with the campaign may potentially exceed a pre-determined risk threshold (e.g., whether the campaign is a potentially high-risk campaign). The system may do this, for example, by using any of the above techniques to assign a collective risk score to the user's answers to the questions and determining whether the collective risk score exceeds a particular risk threshold value. Alternatively, the system may be configured to determine that the risk associated with the campaign exceeds the risk threshold value if the user answers a particular one or more of the questions in a certain way.

The system may be configured for, in response to the user's answers to one or more of the questions within the Privacy Threshold Assessment indicating that the campaign exceeds, or may potentially exceed, a pre-determined risk threshold, presenting the user with a longer set of detailed questions regarding the campaign (e.g., a Privacy Impact Assessment). The system may then use the user's answers to this longer list of questions to assess the overall risk of the campaign, for example, as described above.

In particular embodiments, the system may be configured for, in response to the user's answers to one or more of the questions within the Privacy Threshold Assessment indicating that the campaign does not exceed, or does not potentially exceed, a pre-determined risk threshold, not presenting the user with a longer set of detailed questions regarding the campaign (e.g., a Privacy Impact Assessment). In such a case, the system may simply save an indication to memory that the campaign is a relatively low risk campaign.

Accordingly, in particular embodiments, the system may be adapted to automatically initiate a Privacy Impact Assessment if the results of a shorter Privacy Threshold Assessment satisfy certain criteria. Additionally, or alternatively, in particular embodiments, the system may be adapted to allow a privacy officer to manually initiate a Privacy Impact Assessment for a particular campaign.

In particular embodiments, built into the Privacy Threshold Assessment and the Privacy Impact Assessment are the data mapping questions and/or sub-questions of how the personal data obtained through the campaign will be collected, used, stored, accessed, retained, and/or transferred, etc. In particular embodiments: (1) one or more of these questions are asked in the Privacy Threshold Assessment; and (2) one or more of the questions are asked in the Privacy Impact Assessment. In such embodiments, the system may obtain the answers to each of these questions, as captured during the Privacy Threshold Assessment and the Privacy Impact Assessment, and then use the respective answers to generate the end-to-end data flow for the relevant privacy campaign.

The system may then link all of the data flows across all of the organization's privacy campaigns together in order to show a complete evergreen version of the personal data inventory of the organization. Thus, the system may efficiently generate the personal data inventory of an organization (e.g., through the use of reduced computer processing power) by automatically gathering the data needed to prepare the personal data inventory while conducting Privacy Threshold Assessments and Privacy Impact Assessments.

Automated Approach to Demonstrating Privacy By Design

Privacy by design is a documented approach to managing privacy risks. One of the primary concepts is evaluating privacy impacts, and making appropriate privacy-protecting changes during the design phase of a project, before the project go-live. Organizations have embraced the concept, but have struggled with how to operationalize and demonstrate that they are doing this.

In various embodiments, the system is adapted to automate this with the following capabilities: (1) initial assessment; (2) gap analysis/recommendations; and/or (3) final/updated assessment. These capabilities are discussed in greater detail below.

Initial Assessment

In various embodiments, when a business team within a particular organization is planning to begin a privacy campaign, the system presents the business team with a set of assessment questions that are designed to help one or more members of the organization's privacy team to understand what the business team's plans are, and to understand whether the privacy campaign may have privacy impact on the organization. The questions may also include a request for the business team to provide the "go-live" date for the privacy campaign. In response to receiving the answers to these questions, the system stores the answers to the system's memory and makes the answers available to the organization's privacy team. The system may also add the "go-live" date to one or more electronic calendars (e.g., the system's electronic docket).

Gap Analysis/Recommendations

After the system receives the answers to the questions, one or more members of the privacy team may review the answers to the questions. The privacy team may then enter, into the system, guidance and/or recommendations regarding the privacy campaign. In particular embodiments, the system automatically reminds one or more members of the business team to implement the privacy team's recommendations before the go-live date. The system may also implement one or more audits (e.g., as described above) to make sure that the business team incorporates the privacy team's recommendations before the "go-live" date.

Final/Updated Assessment

Once the mitigation steps and recommendations are complete, the system may (e.g., automatically) conduct an updated review to assess the updated privacy impact and privacy risks.

Reporting and Historical Logging Capabilities

In particular embodiments, the system includes unique reporting and historical logging capabilities to automate Privacy-by-Design reporting. In various embodiments, the system is adapted to: (1) measure/analyze the initial assessment answers from the business team; (2) measure recommendations for the privacy campaign; (3) measure any changes that were implemented prior to the go-live date; (4) automatically differentiate between: (a) substantive privacy protecting changes, such as the addition of encryption, anonymization, or minimizations; and (b) non-substantive changes, such as spelling correction.

The system may also be adapted to generate a privacy-by-design report showing that: (1) projects are evaluated prior to go-live; and (2) substantive recommendations are made and implemented prior to go-live. This may be useful in documenting that privacy-by-design is being effectively implemented for a particular privacy campaign.

System for Preventing Individuals from Trying to Game the System

As discussed above, in particular embodiments, the system is adapted to display a series of threshold questions for particular privacy campaigns and to use conditional logic to assess whether to present additional, follow-up questions to the user. There may be situations in which a user may answer, or attempt to answer, one or more of the threshold questions incorrectly (e.g., dishonestly) in an attempt to avoid needing to answer additional questions. This type of behavior can present serious potential problems for the organization because the behavior may result in privacy risks associated with a particular privacy campaign being hidden due to the incorrect answer or answers.

To address this issue, in various embodiments, the system: (1) maintains a historical record of every button press (e.g., un-submitted system input) that an individual makes when a question is presented to them; and (2) tracks, and saves to memory, each incidence of the individual changing their answer to a question (e.g., (a) before formally submitting the answer by pressing an "enter" key, or other "submit" key on a user interface, such as a keyboard or graphical user interface on a touch-sensitive display screen; or (b) after initially submitting the answer).

The system may also be adapted to automatically determine whether a particular question (e.g., threshold question) is a "critical" question that, if answered in a certain way, would cause the conditional logic trigger to present the user with one or more follow-up questions. For example, the system may, in response to receiving the user's full set of answers to the threshold questions, automatically identify any individual question within the series of threshold questions that, if answered in a particular way (e.g., differently than the user answered the question) would have caused the system to display one or more follow up questions. The system may then flag those identified questions, in the system's memory, as "critical" questions.

Alternatively, the system may be adapted to allow a user (e.g., a privacy officer of an organization) who is drafting a particular threshold question that, when answered in a particular way, will automatically trigger the system to display one or more follow up questions to the user, to indicate that is a "critical" threshold question. The system may then save this "critical" designation of the question to the system's computer memory.

In various embodiments, the system is configured, for any questions that are deemed "critical" (e.g., either by the system, or manually, as discussed above), to determine whether the user exhibited any abnormal behavior when answering the question. For example, the system may check to see whether the user changed their answer once, or multiple times, before submitting their answer to the question (e.g., by tracking the user's keystrokes while they are answering the threshold question, as described above). As another example, the system may determine whether it took the user longer than a pre-determined threshold amount of time (e.g., 5 minutes, 3 minutes, etc.) to answer the critical threshold question.

In particular embodiments, the system may be adapted, in response to determining that the user exhibited abnormal behavior when answering the critical threshold question, to automatically flag the threshold question and the user's answer to that question for later follow up by a designated individual or team (e.g., a member of the organization's privacy team). In particular embodiments, the system may also, or alternatively, be adapted to automatically generate and transmit a message to one or more individuals (e.g., the organization's chief privacy officer) indicating that the threshold question may have been answered incorrectly and that follow-up regarding the question may be advisable. After receiving the message, the individual may, in particular embodiments, follow up with the individual who answered the question, or conduct other additional research, to determine whether the question was answered accurately.

Conclusion

Although embodiments above are described in reference to various privacy compliance monitoring systems, it should be understood that various aspects of the system described above may be applicable to other privacy-related systems, or to other types of systems, in general.

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. While examples discussed above cover the use of various embodiments in the context of operationalizing privacy compliance and monitoring user inputs related to privacy campaigns, various embodiments may be used in any other suitable context. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer-implemented data processing method for electronically receiving the input of campaign data related to a privacy campaign and electronically calculating a risk level for the privacy campaign based on the data inputs comprising:

displaying on a graphical user interface a prompt to create an electronic record for a privacy campaign, wherein the privacy campaign utilizes personal data collected from at least one or more persons or one or more entities;

receiving a command to create an electronic record for the privacy campaign;

creating an electronic record for the privacy campaign and digitally storing the record;

presenting, on one or more graphical user interfaces, a plurality of prompts for the input of campaign data related to the privacy campaign;

electronically receiving campaign data input by one or more users, wherein the campaign data identifies each of:

a description of the campaign;

one or more types of personal data related to the campaign;

a subject from which the personal data was collected;

the storage of the personal data; and access to the personal data;

processing the campaign data by electronically associating the campaign data with the record for the privacy campaign;

receiving, by one or more computer processors, a request to associate an electronic message with the record for the privacy campaign;

in response to receiving the request, associating the electronic message with the record for the privacy campaign;

digitally storing the campaign data associated with the record for the campaign;

using one or more computer processors, calculating a risk level for the campaign based on the campaign data, wherein calculating the risk level for the campaign comprises:

electronically retrieving from a database the campaign data associated with the record for the campaign;

electronically determining a plurality of weighting factors for the campaign, wherein the plurality of weighting factors are based upon a plurality of factors including:

the nature of the personal data associated with the campaign;

the physical location of the personal data associated with the campaign;

the length of time that the personal data associated with the campaign will be retained in storage;

the type of individual from which the personal data associated with the campaign originated; and the country of residence of the individual from which the personal data associated with the campaign originated;

electronically assigning a relative risk rating for each of the plurality of factors; and electronically calculating a risk level for the campaign based upon the plurality of weighting factors and the relative risk rating for each of the plurality of factors; and digitally storing the risk level associated with the record for the campaign:

scanning one or more pieces of content in the electronic message;

after scanning the one or more pieces of content, analyzing the one or more pieces of content to identify one or more keywords in the electronic message;

determining, based at least in part on the one or more keywords, whether to modify the risk level for the privacy campaign;

in response to determining to modify the risk level, calculating an updated risk level for the particular privacy campaign by;

electronically modifying at least one of the plurality of weighting factors;

electronically calculating an updated risk level based at least in part on the modified plurality of weighting factors; and digitally storing the updated risk level associated with the record for the campaign.

2. The computer-implemented data processing method of claim 1, further comprising electronically determining an audit schedule for the campaign based at least in part on the risk level.

3. The computer-implemented data processing method of claim 2, further comprising:

scanning the electronic message to identify at least one piece of content within the electronic message; and modifying the audit schedule based at least in part on the at least one piece of content.

4. The computer-implemented data processing method of claim 1, wherein:

the method further comprises providing a browser plug-in for installation on a computer device, the browser plug-in being configured to receive the request to associate the electronic message with the record for the privacy campaign; and receiving the request to associate the electronic message with the record for the privacy campaign comprises receiving the request via the browser plug-in.

5. The computer-implemented data processing method of claim 1, wherein:

the method further comprises establishing an e-mail alias associated with the campaign; and receiving the request to associate the electronic message with the record for the privacy campaign comprises receiving the electronic message in response to an individual forwarding the electronic message to the e-mail alias.

6. The computer-implemented data processing method of claim 1, wherein the plurality of weighting factors are based upon the electronic message.

7. The computer implemented data processing method of claim 1, further comprising:

scanning the electronic message to identify at least one piece of content within the electronic message; and determining, based at least in part on the at least one piece of content, whether to associate the electronic message with the campaign.

8. The computer-implemented data processing method of claim 7, wherein the at least one piece of content comprises at least one unique identifier associated with the campaign.

9. The computer implemented data processing method of claim 1, further comprising:

in response receiving the command to create the electronic record for the privacy campaign, automatically generating an e-mail alias and associating the e-mail alias with the privacy campaign.

10. The computer implemented data processing method of claim 9, wherein receiving the request to associate the electronic message with the record for the privacy campaign comprises receiving the electronic message via a forwarded electronic message to the e-mail alias.

11. A computer-implemented data processing method of electronically modifying a data structure comprising campaign data related to a privacy campaign, the method comprising:

receiving, by one or more processors, a request to modify a data structure to include one or more electronic messages, wherein the data structure digitally stores campaign data related to a privacy campaign, and the campaign data identifies each of:

a description of the privacy campaign;

one or more types of personal data related to the privacy campaign;

a subject from which the personal data was collected;

a storage location of the personal data;

one or more access permissions related to the personal data;

a risk level for the privacy campaign, wherein the risk level is calculated by:

identifying a plurality of risk factors for the privacy campaign, wherein each of the plurality of risk factors has an associated weighting factor and the plurality of risk factors includes:

a type of the personal data collected as part of the particular privacy campaign;

information about a type of data subject from which the personal data is collected as part of the particular privacy campaign; and storage information for the personal data collected as part of the particular privacy campaign; and electronically calculating the risk level for the privacy campaign based upon, for each respective one of the plurality of risk factors, the weighting factor for the risk factor, in response to receiving the request:

scanning one or more pieces of content in the one or more electronic messages;

after scanning the one or more pieces of content, analyzing the one or more pieces of content;

determining based at least in part on the one or more pieces of content, whether to modify the data structure to include the one or more messages;

in response to determining to modify the data structure, modifying, by one or more processors, the data structure to include the one or more electronic messages;

associating, in the data structure, the one or more electronic messages with the campaign data;

determining, based at least in part on the one or more pieces of content, whether to modify the risk level for the privacy campaign; and in response to determining to modify the risk level, calculating an updated risk level for privacy campaign by:

electronically modifying the associated weighting factor for at least one of the plurality of risk factors;

after electronically modifying the associated weighting factor for the at least one of the plurality of risk factors; electronically calculating a modified risk level for the privacy campaign based upon, for each respective one of the plurality of risk factors, the associated weighting factor; and digitally storing the modified risk level with the campaign data.

12. The computer-implemented data processing method of claim 11, further comprising electronically determining an audit schedule for the campaign based at least in part on the risk level.

13. The computer-implemented data processing method of claim 12, wherein:

the method further comprises providing a software plug-in for installation on a computing device, wherein the software plug-in is configured to integrate with one or more electronic messaging programs; and receiving the request to modify the data structure to include the one or more electronic messages comprises receiving the request via the software plug-in.

14. The computer-implemented data processing method of claim 11, further comprising:

receiving, by one or more processors, a request to modify a data structure to include one or more second electronic messages related to a second privacy campaign;

determining, by one or more processors, whether the second privacy campaign is an existing privacy campaign;

in response to determining that the second privacy campaign is an existing privacy campaign, modifying, by one or more processors, campaign data associated with the second privacy campaign to include the one or more second electronic messages; and in response to determining that the second privacy campaign is not an existing privacy campaign:

storing the one or more second electronic messages in memory; and tagging the one or more second electronic messages as unassigned.

15. The computer-implemented data processing method of claim 14, wherein:

the method further comprises providing, by one or more processors, a software plug-in for installation on a computing device;

receiving the request to modify the data structure to include the one or more second electronic messages related to the second privacy campaign comprises receiving the request via the software plug-in.

16. The computer-implemented data processing method of claim 15, wherein the software plug-in is a plug-in selected from the group consisting of:

a browser plug-in extension configured for capturing the one or more electronic messages via webmail; and an electronic messaging application plug-in configured for capturing the one or more electronic messages from the electronic messaging application.

17. A computer-implemented data processing method of electronically modifying campaign data related to a particular privacy campaign of a plurality of privacy campaigns, the method comprising:

providing, by one or more processors, a software plug-in for installation on a computing device;

receiving, by one or more processors, via the software plug-in, a request to modify campaign data for a particular privacy campaign of a plurality of privacy campaigns to include one or more electronic messages, wherein the campaign data identifies each of:

a description of the particular privacy campaign;

one or more types of personal data related to the particular privacy campaign;

a subject from which the personal data was collected;

a storage location of the personal data;

one or more access permissions related to the personal data; and a risk level for the particular privacy campaign;

in response to receiving the request:

scanning one or more pieces of content in the one or more electronic messages;

after scanning the one or more pieces of content, analyzing the one or more pieces of content; and identifying the particular privacy campaign of the plurality of privacy campaigns based at least in part on the analyzed one or more pieces of content;

modifying, by one or more processors, the campaign data for the particular privacy campaign to include the one or more electronic messages;

associating, in the data structure, the one or more electronic messages with the campaign data;

analyzing the one or more pieces of content to identify one or more keywords in the one or more messages;

determining, based at least in part on the one or more keywords, whether to modify the risk level for the particular privacy campaign; and in response to determining to modify the risk level, calculating an updated risk level for the particular privacy campaign by:

identifying a plurality of risk factors for the particular privacy campaign, wherein each of the plurality of risk factors has an associated weighting factor and the plurality of risk factors includes:

a type of the personal data collected as part of the particular privacy campaign;

information about a type of data subject from which the personal data is collected as part of the particular privacy campaign; and storage information for the personal data collected as part of the particular privacy campaign;

electronically modifying the associated weighting factor for at least one of the plurality of risk factors;

electronically calculating the updated risk level for the privacy campaign based upon, for each respective one of the plurality of risk factors, the weighting factor for the risk factor; and digitally storing the updated risk level associated with the record for the campaign.

18. The computer-implemented data processing method of claim 17, wherein the software plug-in is a plug-in selected from the group consisting of:

a browser plug-in extension configured for capturing the one or more electronic messages via webmail; and an electronic messaging application plug-in configured for capturing the one or more electronic messages from the electronic messaging application.

19. The computer-implemented data processing method of claim 17, wherein:

the one or more pieces of content comprise information related a type of personal data collected as part of the particular privacy campaign other than the one or more types of personal data related to the particular privacy campaign indicated in the campaign data;

electronically modifying the associated weighting factor for at least one of the plurality of risk factors comprises modifying the associated weighting factor for the type of personal data collected as part of the particular privacy campaign.

20. The computer-implemented data processing method of claim 17, wherein:

the one or more pieces of content indicate that the particular privacy campaign is winding down soon; and the calculated risk level is lower than a previous risk level for the particular privacy campaign.

* * * * *

UNITED STATES PATENT AND TRADEMARK OFFICE
CERTIFICATE OF CORRECTION

| | |
|---|---|
| PATENT NO. | : 9,892,443 B2 |
| APPLICATION NO. | : 15/619382 |
| DATED | : February 13, 2018 |
| INVENTOR(S) | : Kabir A. Barday |

It is certified that error appears in the above-identified patent and that said Letters Patent is hereby corrected as shown below:

In the Claims

At Claim 11, Column 24, Line 47, replace the words "the risk factor," with the words -- the risk factor; --

At Claim 11, Column 24, Line 66, after the words "risk level for" please insert the word -- the --

Signed and Sealed this
First Day of May, 2018

Andrei Iancu
*Director of the United States Patent and Trademark Office*